(12) United States Patent
Zhou et al.

(10) Patent No.: US 7,759,432 B2
(45) Date of Patent: Jul. 20, 2010

(54) EMULSION CONTAINING EPOXY RESIN

(75) Inventors: Ke Zhou, Mississauga (CA); Anna-Karin Eriksson, Sodertalje (SE); Guerino G. Sacripante, Oakville (CA)

(73) Assignee: Xerox Corporation, Norwalk, CT (US)

( * ) Notice: Subject to any disclaimer, the term of this patent is extended or adjusted under 35 U.S.C. 154(b) by 1121 days.

(21) Appl. No.: 11/248,277

(22) Filed: Oct. 13, 2005

(65) Prior Publication Data

US 2007/0088117 A1   Apr. 19, 2007

(51) Int. Cl.
G03G 9/087 (2006.01)
(52) U.S. Cl. .................. 525/438; 523/402; 523/423; 525/407; 430/109.2; 430/137.14; 524/539
(58) Field of Classification Search .............. 430/109.2, 430/137.14, 137.15; 524/539, 407, 438; 523/423, 402; 525/407, 438
See application file for complete search history.

(56) References Cited

U.S. PATENT DOCUMENTS

| | | | |
|---|---|---|---|
| 3,590,000 A | 6/1971 | Palermiti et al. | |
| 3,847,604 A | 11/1974 | Hagenbach et al. | |
| 3,945,964 A | 3/1976 | Hastings et al. | |
| 4,029,620 A | 6/1977 | Chen | |
| 4,298,672 A | 11/1981 | Lu | |
| 4,338,390 A | 7/1982 | Lu | |
| 4,396,649 A | 8/1983 | Bailey et al. | |
| 4,567,133 A * | 1/1986 | Isbrandt et al. | 430/348 |
| 4,935,326 A | 6/1990 | Creatura et al. | |
| 4,937,166 A | 6/1990 | Creatura et al. | |
| 5,057,392 A * | 10/1991 | McCabe et al. | 430/109.2 |
| 5,236,629 A | 8/1993 | Mahabadi et al. | |
| 5,330,874 A | 7/1994 | Mahabadi et al. | |
| 5,840,462 A | 11/1998 | Foucher et al. | |
| 5,916,725 A | 6/1999 | Patel et al. | |
| 6,020,101 A | 2/2000 | Sacripante et al. | |
| 6,214,507 B1 | 4/2001 | Sokol et al. | |
| 6,310,125 B1 * | 10/2001 | Rayner | 524/195 |
| 6,713,222 B2 | 3/2004 | Sacripante et al. | |
| 6,894,090 B2 | 5/2005 | Shinzo et al. | 523/223 |
| 2002/0160294 A1 * | 10/2002 | Okuno et al. | 430/124 |
| 2003/0124448 A1 * | 7/2003 | Shinzo et al. | 430/109.4 |
| 2003/0175609 A1 * | 9/2003 | Combes et al. | 430/108.22 |
| 2003/0219667 A1 * | 11/2003 | Matsumoto et al. | 430/108.7 |
| 2004/0110077 A1 * | 6/2004 | Yachi et al. | 430/108.6 |
| 2004/0146798 A1 * | 7/2004 | Farrugia et al. | 430/137.14 |
| 2005/0068593 A1 * | 3/2005 | Hayase et al. | 359/1 |
| 2005/0165133 A1 * | 7/2005 | Sacripante et al. | 523/335 |
| 2006/0128830 A1 * | 6/2006 | Breton et al. | 523/160 |
| 2006/0160010 A1 | 7/2006 | Patel et al. | |
| 2006/0240353 A1 * | 10/2006 | Matsumura et al. | 430/109.4 |
| 2007/0003856 A1 * | 1/2007 | Farrugia et al. | 430/110.2 |

FOREIGN PATENT DOCUMENTS

| | | |
|---|---|---|
| EP | 0 928 995 A2 | 7/1999 |
| EP | 1 684 124 A2 | 7/2006 |
| JP | A 06-230598 | 8/1994 |

OTHER PUBLICATIONS

Jan. 22, 2007 European Search Report.
Yang et al., "Preparation of waterborne dispersions of epoxy resin by the phase-inversion emulsification technique. 1. Experimental study on the phase-inversion process," Colloid Polym Sci, vol. 278, pp. 1164-1171, 2000.
Yang et al., "Preparation of waterborne dispersions of epoxy resin by the phase-inversion emulsification technique. 2. Theoretical consideration of the phase-inversion process," Colloid Polym Sci, vol. 278, pp. 1103-1108, 2000.
Yang et al., "Preparation of waterborne ultrafine particles of epoxy resin by phase inversion technique," Chinese Journal of Polymer Science, vol. 15, No. 1, pp. 92-96, 1996.
Hibino et al., "Particle Formation of epoxy Resins in Aqueous Emusin State," Macro. Mater. Eng., vol. 286, No. 6, pp. 325-329, 2001.

* cited by examiner

Primary Examiner—Mark F Huff
Assistant Examiner—Rachel L Burney
(74) Attorney, Agent, or Firm—Oliff & Berridge, PLC

(57) ABSTRACT

The emulsion herein is of an epoxy resin having a glass transition temperature of at least about 40° C., wherein the average diameter of the epoxy resin particles in the emulsion is 500 nm or less. The emulsion may include an epoxy resin, a sulfonated polyester resin and a nonionic surfactant. The emulsion may be used to produce a toner particle in an emulsion aggregation method.

16 Claims, No Drawings

EMULSION CONTAINING EPOXY RESIN

BACKGROUND

Described herein are emulsions comprising an epoxy resin, and more in particular emulsions comprising an epoxy resin, a sulfonated polyester resin and a nonionic surfactant. In embodiments, a phase inversion process prepares the emulsion.

The emulsions described herein find particular utility in the manufacture of toners, for example in the manufacture of toners as prepared by an emulsion aggregation method. The emulsions may find utility in the making of toner compositions as well as coating application. The emulsions described herein have the advantage of being able to be used in the formation of emulsion aggregation toners at temperatures that do not cause crosslinking of the epoxy, thereby enabling derivation of toners that may be fused at lower temperatures and that form images having good image permanence, including crease resistance, as a result of crosslinking during fusing or post fusing. The toners may be selected for a number of electrophotographic imaging methods and/or printing processes, including color processes, digital systems and processes, and lithography.

REFERENCES

U.S. Pat. No. 3,945,964 describes stable aqueous emulsions of epoxy resins containing as an emulsifying agent between 2 and 10% by weight relative to the weight of the epoxy resin of ethylene oxide propylene oxide block polymers having the formulae R—O—CH(CH$_3$CH—O]$_X$[CH$_2$CH$_2$—O]$_Y$H and R—O—CH$_2$CH$_2$(CH$_3$)—O]$_X$[CH$_2$CH$_2$—O]$_Y$H in which X is an integer of at least 8 and at most 22, Y is an integer from at least 25 and at most 40, and R is a radical of the group consisting of alkenyl, aralkyl, cycloalkyl, aralkenyl and cycloalkenyl radicals.

U.S. Pat. No. 4,396,649 describes tertiary nitrogen-containing chain-extended epoxy resins, capable of forming stable aqueous emulsions, produced by chain-extending an epoxy resin using a tertiary nitrogen containing ether or ester polyol for example, particularly, polycaprolactone which has been polymerization initiated by a tertiary amine polyol such as N-methyl diethanolamine. The corresponding amine salt is formed by treatment with an acid for example acetic acid and the resulting cationic polymer may be dispersed in water to form a cationic emulsion capable of being coated onto a substrate by electrodeposition. The chain extended resins, by virtue by their content of free epoxy groups, are also usable for cross-linking and other uses.

U.S. Pat. No. 4,029,620 discloses a thermally curable aqueous emulsion coating composition in which liquid particles of resinous polyepoxide are emulsified by means of a nonionic surfactant. There is also present an organic solvent soluble carboxyl functional copolymer that is dispersed by means of salt formation utilizing partial neutralization with ammonia or an amine to disperse the copolymer. The combination of nonionic surfactant emulsification of the epoxy resin and partial neutralization of the copolymer carboxyl is described to serve to provide storage stability for the otherwise unstable system.

SUMMARY

What is still desired is an aqueous emulsion of an epoxy resin, and in particular an epoxy resin having a glass transition temperature of at least about 40° C., that exhibits a small average resin particle diameter, for example of 500 nm or less, and which is suitable for use in forming toner particles in an emulsion aggregation process.

In embodiments, described is an emulsion comprised of an epoxy resin having a glass transition temperature of at least about 40° C., wherein the average diameter of the epoxy resin particles in the emulsion is 500 nm or less.

In embodiments, described is an emulsion comprised of an epoxy resin, a sulfonated polyester resin and a nonionic surfactant. Particularly, the epoxy resin and the sulfonated polyester resin are present as a mixture in emulsified particles dispersed in the aqueous phase of the emulsion.

In further embodiments, described is a toner comprising a binder, a colorant and optionally a wax, wherein the binder comprises a mixture of an epoxy resin and a sulfonated polyester resin.

In still further embodiments, described is a process of preparing an emulsion, comprising heating a mixture of an epoxy resin, a sulfonated polyester resin and a nonionic surfactant to from about 50° C. to about 120° C., stirring the mixture, and while maintaining the temperature at from about 50° C. to about 120° C., metering water into the mixture until phase inversion occurs to form the emulsion.

The emulsion may be used to produce toner particles, for example by an emulsion aggregation method. For example, such process may comprise adding a colorant to the emulsion, heating to below a glass transition temperature of at least the epoxy resin, adding an aggregating agent, and aggregating the mixture to form toner particles.

EMBODIMENTS

Toners may be comprised of thermoplastic resin binders that typically exhibit flow properties such as a viscosity range of about 1,000 poise to about 100,0000 poise at temperatures of from about 70° C. to about 180° C., thereby permitting the toner to wet or penetrate into a substrate such as paper upon which the toner is to be fixed in forming an image. The toner image, once melted and cooled onto the substrate, displays mechanical properties such as crease, as determined by creasing a section of the substrate such as paper with a toned image thereon and quantifying the degree to which the toner in the crease separates from the paper. A good crease resistance may be considered a value of less than 1 mm, where the average width of the creased image is measured by printing an image on paper, followed by (a) folding inwards the printed area of the image, (b) passing over the folded image a standard TEFLON coated copper roll weighing about 860 grams, (c) unfolding the paper and wiping the loose ink from the creased imaged surface with a cotton swab, and (d) measuring the average width of the ink free creased area with an image analyzer. The crease value can also be reported in terms of area, especially when the image is sufficiently hard to break unevenly on creasing; measured in terms of area, crease values of 100 millimeters correspond to about 1 mm in width. Further, the images exhibit fracture coefficients, for example of greater than unity. From the image analysis of the creased area, it is possible to determine whether the image shows a small single crack line or is more brittle and easily cracked. A single crack line in the creased area provides a fracture coefficient of unity while a highly cracked crease exhibits a fracture coefficient of greater than unity. The greater the cracking, the greater the fracture coefficient. Toners exhibiting acceptable mechanical properties, which are suitable for office documents, may be obtained by utilizing the aforementioned thermoplastic resins. However, there is also a need for digital xerographic applications for flexible packaging on various substrates. For flexible packaging applications, the toner materials must meet very demanding requirements such as being able to withstand the high temperature conditions to which they are exposed in the packaging process and enabling hot pressure-resistance of the images. Other applications, such as books and manuals, require that the image does not document offset onto the adjacent image. These additional requirements require alternate resin systems, for example that provide thermoset properties such that a crosslinked resin results after fusing or post-fusing on the toner image.

A desirable toner resin, then, should have a thermoplastic property, such as low viscosity during fusing so as to permit the fusing to proceed at a temperature of, for example on the order of about 160° C. or less, for example from about 70° C. to about 150° C. or from about 80° C. to about 140° C., and then after or during the melting onto the image receiving substrate, should be transformable into a thermoset state such as a higher molecular weight by crosslinking or curing of the resin. The resultant high molecular weight resin in the fused image exhibits the mechanical properties, such as fracture coefficient, crease resistance and packaging requirements such as hot pressure-resistance, and high document offset.

It is, however, typically difficult to prepare useful toners containing epoxy resin binders via conventional blending and grinding physical methods, for example methods involving blending the toner materials, extruding the materials through a die, pelletizing, subjecting to jetting to reduce the size (diameter) of the particles, and classifying. This is because at the higher temperatures required for the blending, for example temperatures of about 160° C. to about 250° C. or more, the epoxy resin may crosslink, particularly if a catalyst sensitive to lower temperatures such as below 160° C. is used for curing of the epoxy. Thus, epoxy resins that may be cured in the presence of a curing agent at temperatures of less than about 160° C., such as from about 35° C. to about 160° C. or from about 50° C. to about 150° C., for example which would be useful in the formation of toners that may be fused at lower temperatures such as about 160° C. or less, for example from about 70° C. to about 150° C. or from about 80° C. to about 140° C., must be prepared by other than the aforementioned conventional physical process.

Emulsion aggregation methods, for example wherein submicron sized particles of the binder resin in an emulsion are aggregated to toner particle size in the presence of an aggregating agent or coagulant, enables the production of toner particles at temperatures on the order of about 100° C. or less, such as from about 40° C. to about 100° C. or from about 50° C. to about 90° C. As such, this process for preparing toner particles may enable the production of toner particles based on epoxy resin binders while avoiding crosslinking of the epoxy before the image fusing operation.

To facilitate the manufacture of epoxy resin based toners by an emulsion aggregation process, described herein are aqueous emulsions of epoxy resin that are ideally suited for making toner resins there from. The aqueous emulsions described herein may also find utility in other fields, for example in coatings and the like, for example such as automotive, boat, flooring and metal coatings.

In embodiments, described is an emulsion comprised of an epoxy resin having a glass transition temperature of at least about 40° C., wherein the average diameter of the epoxy resin particles in the emulsion is 500 nm or less, for example less than about 350 nm. In further embodiments, described is an aqueous emulsion comprised of an epoxy resin, a sulfonated polyester resin and a nonionic surfactant.

As the epoxy resin, any resin, for example any material having a weight average molecular weight of, for example, about 500 or more, such as 1,000 or more, and containing epoxy groups may be used. Epoxy resin herein refers to, for example, any molecule containing more than one epoxide (oxirane) group. As epoxy resins, use may be made of, for example, glycidyl epoxy resins, such as glycidyl epoxy ethers, glycidyl epoxy esters, glycidyl epoxy amines, and the like. In embodiments, the epoxy resin is an epoxy based upon bisphenol A, for example such as based upon a reaction product of bisphenol A and epichlorohydrin, such as including diglycidyl ethers of bisphenol A. Novolac epoxy resins, for example such as formed by the reaction of phenolic novolac resins with epichlorohydrin, may also be used. Suitable commercially available examples of epoxy resins include the D.E.R. epoxy resins from The Dow Chemical Company, including D.E.R. 664U that is described as a reaction product between liquid epoxy resin and bisphenol A.

The epoxy resin may have a glass transition temperature of about 40° C. or more, for example from about 40° C. to about 90° C., and preferably such as from about 50° C. to about 65° C. In addition, the epoxy resin may exhibit a viscosity at the phase inversion temperature (which may be from about 50° C. to about 120° C., for example from about 60° C. to about 105° C. or from about 70° C. to about 100° C.) of from about 10 poise to about 10,000 poise.

The aqueous emulsion also includes at least one sulfonated polyester, or sulfopolyester, resin. As the sulfonated polyester resin, mention may be made of, for example, an alkali metal sulfonated polyester resin such as a sodium and/or lithium sulfonated polyester resin.

In embodiments herein, sulfonated refers, for example, to a polyester resin containing a sulfur atom, such as a sulfo group, for example an —$SO_3$ group and the like. In embodiments, the sulfonated polyester resin may have the following general structure, or random copolymers thereof in which the n and p segments are separated:

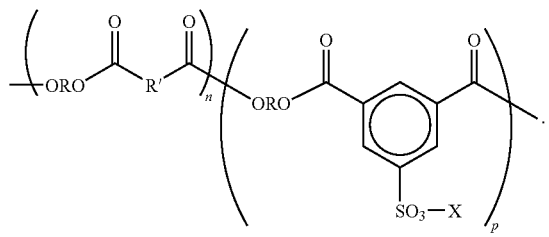

In the formula, R may be an alkylene of, for example, from about 2 to about 25 carbon atoms, such as from about 2 to about 20 carbon atoms or from about 2 to about 10 carbon atoms, such as ethylene, propylene, butylene, oxyalkylene diethyleneoxide and the like, R' may be an arylene of, for example, from about 6 to about 36 carbon atoms, such as from about 6 to about 20 carbon atoms or from about 6 to about 15 carbon atoms, such as a benzylene, bisphenylene, bis(alkyloxy) bisphenolene and the like, and the variables p and n may represent the number of randomly repeating segments, such as for example from about 10 to about 100,000, for example from about 100 to about 50,000 or from about 1,000 to about 50,000, and X may represent an alkali metal such as sodium, lithium, potassium, any combinations thereof, and the like.

In embodiments, R may be ethylene, propylene, dipropylene or a combination thereof, R' may be benzylene, bisphenylene or a combination thereof, and X may be lithium, sodium or a combination thereof. More specifically, R may be propylene and/or dipropylene, R' may be benzylene and X may be sodium.

In further embodiments, the sulfonated polyester may be branched (crosslinked) and/or linear.

The sulfopolyester selected may have a number average molecular weight (Mn) of from about 1,000 to about 500,000, for example from about 1,000 to about 250,000 or from about 5,000 to about 250,000, grams per mole and a weight average molecular weight (Mw) of from about 2,000 to about 600,000, for example from about 2,000 to about 300,000 or from about 10,000 to about 300,000, grams per mole as measured by gel permeation chromatography (GPC) and using polystyrene standards. The onset glass transition temperature (Tg) of the resin as measured by a differential scanning calorimeter (DSC) is, in embodiments, for example, from about 50° C. to about 90° C., and more specifically from about 50° C. to about 70° C.

Examples of sulfonated polyester resins include copoly (ethylene-terephthalate)-copoly-(ethylene-5-sulfo-isophthalate), copoly(propylene-terephthalate)-copoly(propylene-5-sulfo-isophthalate), copoly(diethylene-terephthalate)-copoly (diethylene-5-sulfo-isophthalate), copoly(propylene-diethylene-terephthalate)-copoly(propylene-diethylene-5-sulfo-isophthalate), copoly(5-sulfo-isophthalate-1,3-propylene/dipropylene)-copoly(1,3-propylene/dipropylene-terephthalate), copoly(propylene-butylene-terephthalate)-copoly(propylene-butylene-5-sulfo-isophthalate), copoly (propoxylated bisphenol-A-fumarate)-copoly(propoxylated bisphenol A-5-sulfo-isophthalate), copoly(ethoxylated bisphenol-A-fumarate)-copoly(ethoxylated bisphenol-A-5-sulfo-isophthalate), copoly(ethoxylated bisphenol-A-maleate)-copoly(ethoxylated bisphenol-A-5-sulfo-isophthalate), copoly(5-sulfoisophthaloyl)-co-poly(ethylene-adipate), alkali copoly(5-sulfoisophthaloyl)-copoly(propylene-adipate), copoly(5-sulfoisophthaloyl)-copoly(butylene-adipate), copoly(5-sulfo-isophthaloyl)-copoly(pentylene-adipate), copoly(5-sulfo-iosphthaloyl)-copoly(octylene-adipate), copoly(5-sulfo-isophthaloyl)-copoly(ethylene-adipate), copoly(5-sulfo-isophthaloyl)-copoly (propylene-adipate), copoly(5-sulfo-isophthaloyl)-co-poly(butylene-adipate), copoly(5-sulfo-isophthaloyl)-copoly(pentylene-adipate), copoly(5-sulfo-isophthaloyl)-copoly(hexylene-adipate), copoly(5-sulfo-isophthaloyl)-copoly(octylene-adipate), copoly(5-sulfoisophthaloyl)-copoly(ethylene-succinate), copoly(5-sulfoisophthaloyl-copoly(butylene-succinate), copoly(5-sulfoisophthaloyl)-copoly(hexylene-succinate), copoly(5-sulfo-isophthaloyl)-copoly(octylene-succinate), copoly(5-sulfo-isophthaloyl)-copoly(ethylene-sebacate), copoly(5-sulfo-isophthaloyl)-copoly(propylene-sebacate), copoly(5-sulfo-isophthaloyl)-copoly(butylene-sebacate), copoly(5-sulfo-isophthaloyl)-copoly(pentylene-sebacate), copoly(5-sulfo-isophthaloyl)-copoly(hexylene-sebacate), copoly(5-sulfo-isophthaloyl)-copoly(octylene-sebacate), copoly(5-sulfo-isophthaloyl)-copoly(ethylene-adipate), copoly(5-sulfo-isophthaloyl)-copoly(propylene-adipate), copoly(5-sulfo-iosphthaloyl)-copoly(butylene-adipate), copoly(5-sulfo-isophthaloyl)-copoly(pentylene-adipate), copoly(5-sulfo-isophthaloyl)copoly(hexylene-adipate) and the like. The alkali metal forms of the sulfonated polyesters may have the alkali metal as, for example, a sodium, lithium and/or potassium ion.

The sulfonated polyester resin may exhibit a sulfonation percentage of from about 5% to about 15%, such as from about 5% to about 10% or from about 6% to about 10%, of the resin. Sulfonation percentage refers to, for example, the amount of sulfo groups present, on a weight percentage basis, of the resin. The sulfonation is believed to assist in stabilizing the epoxy resin in the aqueous emulsion.

The epoxy resin and the sulfonated polyester resin are desirably present as a mixture in emulsified particles dispersed in the aqueous phase of the aqueous emulsion. That is, substantially all, for example at least about 70%, for example from about 70% to 100% or from about 80% to 100%, of the emulsified particles in the aqueous medium are comprised of a mixture of the epoxy resin and the sulfonated polyester resin. Further, while chemical reaction between the epoxy resin and the sulfonated polyester resin is not precluded herein, neither is such required.

The emulsified particles in the aqueous medium may have a submicron size, for example of about 1 µm or less, particularly about 500 nm or less, such as from about 10 nm to about 500 µm, from about 10 nm to about 350 mn, or from about 25 nm to about 300 nm.

The aqueous emulsion also includes at least one nonionic surfactant therein. In embodiments, the nonionic surfactant is present in an amount of from about 0.5% to about 10% by weight of the emulsion, for example from about 1% to about 8% or from about 0.5% to about 5% by weight of the emulsion.

Examples of nonionic surfactants that can be selected for the processes illustrated herein and that may be included in the emulsion are, for example, polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy) ethanol, available from Rhone-Poulenac as IGEPAL CA-210™, IGEPAL CA-520™, IGEPAL CA-720™, IGEPAL CO-890™, IGEPAL CO-720™, IGEPAL CO-290™, IGEPAL CA-210™, ANTAROX 890™ and ANTAROX 897™.

A particular example of a suitable nonionic surfactant for use herein is, for example, a block copolymer of polyethylene oxide and polypropylene oxide, for example commercially available as SYNPERONIC PE/F such as including SYNPERONIC PE/F 108.

The aqueous emulsion may also have included therein a hardener or catalyst for curing/crosslinking of the epoxy resin. The catalyst may be a thermal curing catalyst, for example a catalyst that initiates crosslinking of the epoxy resin at temperatures of, for example, about 160° C. or less such as about 50° C. to about 160° C. or from about 100° C. to about 160° C. Examples of suitable epoxy curing catalysts include, for example, blocked acid catalysts such as available from King Industries under the name NACURE, for example including NACURE SUPER XC-7231 and NACURE XC-AD230. Other known catalysts that can react with the epoxy resin to initiate crosslinking may also be used, for example including catalysts such as aliphatic amines and alicyclic amines, for example bis(4-aminocyclohexyl)methane, bis (aminomethyl)cyclohexane, m-xylenediamine, and 3,9-bis (3-aminopropyl)-2,4,8,10-tetraspiro[5,5]undecane; aromatic amines, for example metaphenylene diamine, diaminodiphenylmethane, and diaminodiphenyl sulfone; tertiary amines and corresponding salts, for example benzyldimethylamine, 2,4,6-tris(dimethylaminomethyl)phenol, 1,8-diazabicyclo(5,4,0)undecene-7,1,5-diazabicyclo(4,3,0)nonene-7; aromatic acid anhydrides, for example phthalic anhydride, trimellitic anhydride, and pyromellitic anhydride; alicyclic carboxylic anhydrides, for example tetrahydrophthalic anhydride, methyltetrahydrophthalic anhydride, hexahydrophthalic anhydride, methylhexahydrophthalic anhydride, methylendomethylenetetrahydrophthalic anhydride, dodecenylsuccinic anhydride, and trialkyltetrahydrophthalic anhydrides; polyvalent phenols, for example catechol, resorcinol, hydroquinone, bisphenol F, bisphenol A, bisphenol S, biphenol, phenol novolac compounds, cresol novolac compounds, novolac compounds of divalent phenols such as bisphenol A, trishydroxyphenylmethane, aralkylpolyphenols, and dicyclopentadiene polyphenols; imidazoles and salts thereof, for example 2-methylimidazole, 2-ethyl-4-methylimidazole, and 2-phenylimidazole; $BF_3$ complexes of amine; Bronsted acids, for example aliphatic sulfonium salts and aromatic sulfonium salts; dicyandiamide; organic acid hydrazides, for example adipic acid dihydrazide and phthalic acid dihydrazide; resols; polycarboxylic acids, for example adipic acid, sebacic acid, terephthalic acid, trimellitic acid, polyester resins containing carboxylic groups; organic phosphines; combinations thereof and the like. The catalyst may be included in the emulsion in an amount of from, for example, about 0.1% to about 20% by weight of the emulsion, such as from about 0.5% to about 10% or from about 1% to about 10% by weight of the emulsion.

If the catalyst is included in the aqueous emulsion, the catalyst tends to be incorporated into the submicron emulsified particles formed therein. Alternatively, the catalyst material may be mixed with the particles following formation, for example during aggregation or with the aggregated toner particles. If added after aggregation of the particles, the catalyst tends to be located on the surface of the particles.

The epoxy emulsion herein has good storage stability, for example being able to remain substantially stable over time at room temperature conditions.

The aqueous emulsion is formed, for example, by a process involving phase inversion. Such method permits the emulsion to be formed at temperatures avoiding premature crosslinking of the epoxy resin of the emulsion.

Thus, in embodiments, the process of making the aqueous emulsion comprises heating a mixture of an epoxy resin, a sulfonated polyester resin and a nonionic surfactant to from above about the glass transition temperature of the epoxy resin and sulfonated polyester resin, stirring the mixture, and, while maintaining the temperature at above about the glass transition temperature, metering water into the mixture until phase inversion occurs to form the aqueous emulsion.

In the above-mentioned heating, the heating to above about the glass transition temperature may be from about 50° C. to about 120° C., for example from about 60° C. to about 105° C. or from about 70° C. to about 100° C. The heating need not be held at a constant temperature, but may be varied. For example, the heating may be slowly or incrementally increased during heating until a desired temperature is achieved.

Stirring may be achieved using any suitable stirring device. The stirring need not be at a constant speed, but may be varied. For example, as the heating of the mixture becomes more uniform, the stirring rate may be increased. In embodiments, the stirring may be at from about 10 rpm to about 2,000 rpm, for example from about 50 rpm to about 1,000 rpm or from about 100 rpm to about 600 rpm. Too vigorous an agitation may result in collapse of the emulsion particles.

While the temperature is maintained in the aforementioned range, water, for example deionized water, is then metered into the heated mixture at least until phase inversion is achieved. At phase inversion, the resin particles become emulsified and dispersed within the aqueous phase. That is, an oil-in-water emulsion of the resin particles in the aqueous phase is formed. Phase inversion may be confirmed by, for example, measuring via any of the techniques described in, for example, Z. Yang et al., "Preparations of Waterborne Dispersions of Epoxy Resin by the Phase-Inversion Emulsification Technique," Colloid Polym Sci, vol. 278, pgs 1164-1171 (2000), incorporated herein by reference.

In embodiments, the water is metered into the mixture at a rate of about 0.01% to about 10% by weight of the emulsion every 10 minutes, for example from about 0.5% to about 5% by weight or from about 1% to about 4% by weight of the emulsion every 10 minutes. The rate of water addition need not be constant, but can be varied. Thus, for example for a 700 gram mixture of resins and surfactant(s), the water may be added at a rate of about 1 gram to about 70 grams every 10 minutes, such as from about 2 to about 40 grams or from about 5 to about 25 grams, every 10 minutes. Although the point of phase inversion varies depending on the components of the emulsion, the temperature of heating, the stirring speed, etc., phase inversion may occur when water has been added to comprise from about 30% to about 70% by weight of the emulsion, for example from about 35% to about 65% or from about 40% to about 60% by weight of the emulsion.

Following phase inversion, additional water may be added to dilute the aqueous emulsion as desired, although such is not required at this stage. This additional water may be added at a more rapid rate than the metered rate above. Following phase inversion and/or addition of any additional water, the aqueous emulsion may be cooled to room temperature, for example from about 20° C. to about 26° C.

In embodiments where it is desired to form toner particles from the aqueous emulsion containing submicron particles therein, the process may further comprise at least adding a colorant to the aqueous emulsion, heating the mixture to above a glass transition temperature of the resins, adding an aggregating agent, and aggregating the mixture to form toner particles.

For forming toner particles, the solids content of the starting aqueous emulsion may be from about 5% to about 35% of the emulsion, for example from about 5% to about 20% or from about 10% to about 20% of the emulsion. To achieve this solids content, the emulsion may be diluted during formation as discussed above, or additional water may be added to effect dilution during the toner particle formation process.

As the colorant to be added, various known suitable colorants, such as dyes, pigments, mixtures of dyes, mixtures of pigments, mixtures of dyes and pigments, and the like, may be included in the toner. The colorant may be included in the toner in an amount of, for example, about 0.1 to about 35 percent by weight of the toner, or from about 1 to about 15 weight percent of the toner, or from about 3 to about 10 percent by weight of the toner.

As examples of suitable colorants, mention may be made of carbon black like REGAL 330®; magnetites, such as Mobay magnetites MO8029™, MO8060™; Columbian magnetites; MAPICO BLACKS™ and surface treated magnetites; Pfizer magnetites CB4799™, CB5300™, CB5600™, MCX6369™; Bayer magnetites, BAYFERROX 8600™, 8610™; Northern Pigments magnetites, NP-604™, NP-608™; Magnox magnetites TMB-100™, or TMB-104™; and the like. As colored pigments, there can be selected cyan, magenta, yellow, red, green, brown, blue or mixtures thereof. Generally, cyan, magenta, or yellow pigments or dyes, or mixtures thereof, are used. The pigment or pigments are generally used as water based pigment dispersions.

Specific examples of pigments include SUNSPERSE 6000, FLEXIVERSE and AQUATONE water based pigment dispersions from SUN Chemicals, HELIOGEN BLUE L6900™, D6840™, D7080™, D7020™, PYLAM OIL BLUE™, PYLAM OIL YELLOW™, PIGMENT BLUE 1™ available from Paul Uhlich & Company, Inc., PIGMENT VIOLET 1™, PIGMENT RED 48™, LEMON CHROME YELLOW DCC 1026™, E.D. TOLUIDINE RED™ and BON RED C™ available from Dominion Color Corporation, Ltd., Toronto, Ontario, NOVAPERM YELLOW FGL™, HOSTAPERM PINK E™ from Hoechst, and CINQUASIA MAGENTA™ available from E.I. DuPont de Nemours & Company, and the like. Generally, colorants that can be selected are black, cyan, magenta, or yellow, and mixtures thereof. Examples of magentas are 2,9-dimethyl-substituted quinacridone and anthraquinone dye identified in the Color Index as CI 60710, CI Dispersed Red 15, diazo dye identified in the Color Index as CI 26050, CI Solvent Red 19, and the like. Illustrative examples of cyans include copper tetra(octadecyl sulfonamido) phthalocyanine, x-copper phthalocyanine pigment listed in the Color Index as CI 74160, CI Pigment Blue, and Anthrathrene Blue, identified in the Color Index as CI 69810, Special Blue X-2137, and the like. Illustrative examples of yellows are diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33 2,5-dimethoxy-4-sulfonanilide phenylazo-4'-chloro-2,5-dimethoxy acetoacetanilide, and Permanent Yellow FGL. Colored magnetites, such as mixtures of MAPICO BLACK™, and cyan components may also be selected as colorants. Other known colorants can be selected, such as Levanyl Black A-SF (Miles, Bayer) and Sunsperse Carbon Black LHD 9303 (Sun Chemicals), and colored dyes such as Neopen Blue (BASF), Sudan Blue OS (BASF), PV Fast Blue B2G01 (American Hoechst), Sunsperse Blue BHD 6000 (Sun Chemicals), Irgalite Blue BCA (Ciba-Geigy), Paliogen Blue 6470 (BASF), Sudan II (Matheson, Coleman, Bell), Sudan II (Matheson, Coleman, Bell), Sudan IV (Matheson, Coleman, Bell), Sudan Orange G (Aldrich), Sudan Orange 220 (BASF), Paliogen Orange 3040 (BASF), Ortho Orange OR 2673 (Paul Ulhlich), Paliogen Yellow 152, 1560 (BASF), Lithol Fast Yellow 0991K (BASF), Paliotol Yellow 1840 (BASF), Neopen Yellow (BASF), Novoperm Yellow FG 1 (Hoechst), Permanent Yellow YE 0305 (Paul Uhlich), Lumogen Yellow D0790 (BASF), Sunsperse Yellow YHD 6001 (Sun Chemicals), Suco-Gelb L1250 (BASF), Suco-Yellow D1355 (BASF), Hostaperm Pink E (American Hoechst), Fanal Pink D4830 (BASF), Cinquasia Magenta (DuPont), Lithol Scarlet D3700 (BASF), Toluidine Red (Aldrich), Scarlet for Thermoplast NSD PS PA (Ugine Kuhlmann of Canada), E.D. Toluidine Red (Aldrich), Lithol Rubine Toner (Paul Uhlich), Lithol Scarlet 4440 (BASF), Bon Red C (Dominion Color Company), Royal Brilliant Red RD-8192 (Paul Uhlich), Oracet Pink RF (Ciba-Geigy), Paliogen Red 3871K (BASF), Paliogen Red 3340 (BASF), and Lithol Fast Scarlet L4300 (BASF).

Optionally, a wax may also be included with the binder resin aqueous emulsion and the colorant dispersion. When included, the wax may be present in an amount of from, for example, about 1 weight percent to about 25 weight percent, or from about 5 weight percent to about 20 weight percent, of the toner particles.

Waxes that may be selected include waxes with, for example, a weight average molecular weight of from about 500 to about 20,000, in embodiments from about 500 to about 10,000. Waxes that may be used include, for example, polyolefins such as polyethylene, polypropylene, and polybutene waxes such as commercially available from Allied Chemical and Petrolite Corporation, for example POLYWAX™ polyethylene waxes from Baker Petrolite, wax emulsions available from Michaelman, Inc. and the Daniels Products Company, EPOLENE N-15™ commercially available from Eastman Chemical Products, Inc., and VISCOL 550-P™, a low weight average molecular weight polypropylene available from Sanyo Kasei K. K.; plant-based waxes, such as carnauba wax, rice wax, candelilla wax, sumacs wax, and jojoba oil; animal-based waxes, such as beeswax; mineral-based waxes and petroleum-based waxes, such as montan wax, ozokerite, ceresin, paraffin wax, microcrystalline wax, and Fischer-Tropsch wax; ester waxes obtained from higher fatty acid and higher alcohol, such as stearyl stearate and behenyl behenate; ester waxes obtained from higher fatty acid and monovalent or multivalent lower alcohol, such as butyl stearate, propyl oleate, glyceride monostearate, glyceride distearate, and pentaerythritol tetra behenate; ester waxes obtained from higher fatty acid and multivalent alcohol multimers, such as diethyleneglycol monostearate, dipropyleneglycol distearate, diglyceryl distearate, and triglyceryl tetrastearate; sorbitan higher fatty acid ester waxes, such as sorbitan monostearate, and cholesterol higher fatty acid ester waxes, such as cholesteryl stearate. Examples of functionalized waxes that may be used include, for example, amines, amides, for example AQUA SUPERSLIP 6550™, SUPERSLIP 6530™ available from Micro Powder Inc., fluorinated waxes, for example POLYFLUO 190™, POLYFLUO 200™, POLYSILK 19™, POLYSILK 14™ available from Micro Powder Inc., mixed fluorinated, amide waxes, for example MICROSPERSION 19™ also available from Micro Powder Inc., imides, esters, quaternary amines, carboxylic acids or acrylic polymer emulsion, for example JONCRYL 74™, 89™, 130™, 537™, and 538™, all available from SC Johnson Wax, and chlorinated polypropylenes and polyethylenes available from Allied Chemical and Petrolite Corporation and SC Johnson wax. Mixtures of waxes may also be used. Waxes may be included as, for example, fuser roll release agents.

The toner particles may then be formed from the mixture by heating the mixture to above about the glass transition temperature of the epoxy resin and the sulfonated polyester resin, and thus heating to a temperature of from about 50° C. to about 120° C., for example from about 60° C. to about 110° C. of from about 70° C. to about 100° C., in the presence of an aggregating agent. The aggregation process also may be effected while stirring the mixture.

The toners may thus be prepared by a process that includes aggregating a mixture of a colorant, optionally a wax and any other desired or required additives, and the aqueous emulsion comprising the epoxy resin and the sulfonated polyester resin, and then optionally coalescing the aggregated particles.

In embodiments, a method of making the toner particles including the epoxy resin and the sulfonated polyester resin may comprise admixing and heating the aqueous emulsion of epoxy resin/sulfonated polyester resin and the colorant dispersion, and adding thereto an aqueous solution containing an aggregating agent, and optionally cooling and optionally adding to the toner wax, charge additives, and/or surface flow additives. For example, the toner may be formed in a process comprising admixing the aqueous emulsion of binder resins and a colorant dispersion at a temperature of from about 40° C. to about 100° C., such as from about 50° C. to about 90° C. or from about 50° C. to about 80° C., adding thereto an aggregating agent solution, continuing heating (that is, maintaining within the aforementioned ranges) until aggregated particles of a desired volume average diameter are achieved, cooling and isolating the resulting toner, optionally washing with water, and drying the toner. The aforementioned temperatures for aggregation may be about 3° C. to about 15° C. below the glass transition temperature of at least the epoxy resin, for example about 3° C. to about 10° C. below the glass transition temperature or about 5° C. to about 10° C. below the glass transition temperature.

The dry toner particles, exclusive of external surface additives, may have a volume average diameter of about 3 to about 25 μm, from about 3 to about 12 μm or about 5 to about 10 μm. The particles may also have a geometric size distribution (GSD) (number and/or volume) of, for example, about 1.05 to about 1.45, such as about 1.10 to about 1.40. Herein, the geometric size distribution refers, for example, to the square root of D84 divided by D16, and is measured by a Coulter Counter. The particle diameters at which a cumulative percentage of, for example, 16 percent of particles are attained, refer to the volume and/or number D16 percent, and the particle diameters at which a cumulative percentage of 84 percent are attained are referred to as volume and/or number D84.

During or following aggregation, the epoxy curing catalyst such as discussed above may be added to the toner particles.

As the aggregating agent, mention may be made of, for example, halides such as chloride, bromide or iodide, or anions such as acetates, acetoacetates or sulfates, of vanadium, niobium, tantalum, chromium, molybdenum, tungsten, manganese, iron, ruthenium, cobalt, nickel, copper, zinc, cadmium and/or silver; aluminum salts such as aluminum acetate, aluminum polyaluminum chloride and/or aluminum halides; mixtures thereof and the like. Alkali (II) metal salts, that is divalent alkali metal salts, that may be used as aggregating agents may include, for example, beryllium chloride, beryllium bromide, beryllium iodide, beryllium acetate, beryllium sulfate, magnesium chloride, magnesium bromide, magnesium iodide, magnesium acetate, magnesium sulfate, calcium chloride, calcium bromide, calcium iodide, calcium acetate, calcium sulfate, strontium chloride, strontium bromide, strontium iodide, strontium acetate, zinc acetate, strontium sulfate, barium chloride, barium bromide, barium iodide, or mixtures thereof.

The aggregating agent may be added to the mixture in an amount of, for example, from about 0.1% to about 8% by weight, for example from about 0.1% to about 5% or from about 0.5% to about 5% by weight, of the resin in the mixture. This provides a sufficient amount of agent for aggregation.

In order to control aggregation and coalescence of the particles, in embodiments the aggregating agent may be metered into the mixture over time. For example, the agent may be metered into the mixture over a period of from about 5 to about 240 minutes such as from about 30 to about 200 minutes, although more or less time may be used as desired or required. The addition of the agent may also be done while the mixture is maintained under stirred conditions (such as from about 50 to about 1,000 rpm, for example from about 100 to about 500 rpm) and elevated temperature such as discussed above.

The particles are permitted to aggregate and/or coalesce until a predetermined desired particle size is obtained. A predetermined desired size refers to the desired particle size to be obtained being determined prior to formation, and the particle size being monitored during the growth process until such particle size is reached. Samples may be taken during the growth process and analyzed, for example with a Coulter Counter, for average particle size. The aggregation/coalescence thus may proceed by maintaining the elevated temperature, or slowly raising the temperature to, for example, about 40° C. to about 100° C., and holding for about 0.5 to about 6 hours, for example for about 1 to about 6 hours, while maintaining stirring, to provide the aggregated particles. Once the predetermined desired particle size is reached, then the growth process is halted. In embodiments, the predetermined desired particle size is within the toner particle size ranges mentioned above.

The growth and shaping of the particles following addition of the coagulant may be accomplished under any suitable conditions. For example, the growth and shaping is conducted under conditions in which aggregation occurs separate from coalescence. For separate aggregation and coalescence stages, the aggregation process may be conducted under shearing conditions at an elevated temperature, for example of from about 40° C. to about 90° C., such as from about 45° C. to about 80° C., which may be below the glass transition temperature of at least the epoxy resin as discussed above. Following aggregation to the desired particle size, the particles may then be coalesced to the desired final shape, the coalescence being achieved by, for example, heating the mixture to a temperature of from about 65° C. to about 105° C. or from about 70° C. to about 95° C., which may be at or above the glass transition temperature of at least the epoxy resin, and/or increasing the stirring, for example to about 400 rpm to about 1,000 rpm such as from about 500 rpm to about 800 rpm. Of course, higher or lower temperatures may be used, it being understood that the temperature is a function of the resins used for the binder. Coalescence may be accomplished over a period of from about 0.1 to about 9 hours, for example from about 0.1 to about 4 hours.

After aggregation and/or coalescence, the mixture is cooled to room temperature, such as from about 20° C. to about 26° C. The cooling may be rapid or slow, as desired. A suitable cooling method may comprise introducing cold water to a jacket around the reactor. After cooling, the toner particles are optionally washed with water, and then dried. Drying may be accomplished by any suitable method for drying, including for example freeze-drying.

The toner particles in embodiments may also contain other optional additives, as desired or required. For example, the toner may include positive or negative charge enhancing additives, for example in an amount of about 0.1 to about 10, such as about 1 to about 3, percent by weight of the toner. Examples of these additives include quaternary ammonium compounds inclusive of alkyl pyridinium halides; bisulfates; alkyl pyridinium compounds, reference U.S. Pat. No. 4,298, 672, the disclosure of which is totally incorporated hereby by reference; organic sulfate and sulfonate compositions, reference U.S. Pat. No. 4,338,390, the disclosure of which is totally incorporated hereby by reference; cetyl pyridinium tetrafluoroborates; distearyl dimethyl ammonium methyl sulfate; aluminum salts such as BONTRON E84™ or E88™ (Hodogaya Chemical); mixtures thereof and the like.

There can also be blended with the toner particles external additive particles including flow aid additives, which additives may be present on the surface of the toner particles. Examples of these additives include metal oxides such as titanium oxide, silicon oxide, tin oxide, mixtures thereof, and the like; colloidal silicas, such as AEROSEL®, metal salts and metal salts of fatty acids inclusive of zinc stearate, aluminum oxides, cerium oxides, and mixtures thereof. Each of the external additives may be present in an amount of from about 0.1 percent by weight to about 5 percent by weight, and more specifically, in an amount of from about 0.1 percent by weight to about 1 percent by weight, of the toner. Several of the aforementioned additives are illustrated in U.S. Pat. Nos. 3,590,000 and 6,214,507, the disclosures of which are totally incorporated herein by reference.

The toner particles may be formulated into a developer composition. The toner particles may be mixed with carrier particles to achieve a two-component developer composition. The toner concentration in the developer may range from, for example, about 1% to about 25%, such as about 2% to about 15%, by weight of the total weight of the developer.

Examples of carrier particles that can be selected for mixing with the toner include those particles that are capable of triboelectrically obtaining a charge of opposite polarity to that of the toner particles. Illustrative examples of suitable carrier particles include granular zircon, granular silicon, glass, steel, nickel, ferrites, iron ferrites, silicon dioxide, and the like. Additionally, there can be selected as carrier particles nickel berry carriers as disclosed in U.S. Pat. No. 3,847,604, comprised of nodular carrier beads of nickel, characterized by surfaces of reoccurring recesses and protrusions thereby providing particles with a relatively large external area. Other carriers are disclosed in U.S. Pat. Nos. 4,937,166 and 4,935,326.

The selected carrier particles can be used with or without a coating. In one embodiment, the carrier particles are comprised of a core with coating thereover generated from a mixture of polymers that are not in close proximity thereto in the triboelectric series. The coating may be comprised of fluoropolymers, such as polyvinylidene fluoride resins, terpolymers of styrene, methyl methacrylate, and a silane, such as triethoxy silane, tetrafluoroethylenes, other known coatings and the like. For example, coating containing polyvinylidenefluoride, available, for example, as KYNAR 301F™, and/or polymethylmethacrylate, for example having a weight average molecular weight of about 300,000 to about 350,000, such as commercially available from Soken, may be used. In embodiments, polyvinylidenefluoride and polymethylmethacrylate may be mixed in proportions of from about 30 to about 70 wt. % to about 70 to about 30 wt. %, in embodiments from about 40 to about 60 wt. % to about 60 to about 40 wt. %. The coating may have a coating weight of from, for example, about 0.1 to about 5% by weight of the carrier, such as about 0.5 to about 2% by weight. The PMMA may optionally be copolymerized with any desired comonomer, so long as the resulting copolymer retains a suitable particle size. Suitable comonomers can include monoalkyl, or dialkyl amines, such as a dimethylaminoethyl methacrylate, diethylaminoethyl methacrylate, diisopropylaminoethyl methacrylate, or t-butylaminoethyl methacrylate, and the like. The carrier particles may be prepared by mixing the carrier core with from, for example, about 0.05 to about 10 percent by weight, such as about 0.05 percent and about 3 percent by weight, based on the weight of the coated carrier particles, of polymer until adherence thereof to the carrier core by mechanical impaction and/or electrostatic attraction. Various effective suitable means can be used to apply the polymer to the surface of the carrier core particles, for example, cascade roll mixing, tumbling, milling, shaking, electrostatic powder cloud spraying, fluidized bed, electrostatic disc processing, and with an electrostatic curtain. The mixture of carrier core particles and polymer is then heated to enable the polymer to melt and fuse to the carrier core particles. The coated carrier particles are then cooled and thereafter classified to a desired particle size.

An exemplary suitable carrier is a steel core, for example of about 25 to about 100 μm in size, in embodiments from about 50 to about 75 μm in size, coated with about 0.5% to about 10% by weight, in embodiments from about 0.7% to about 5% by weight, such as about 1% by weight, of a conductive polymer mixture comprised of, for example, methylacrylate and carbon black using the process described in U.S. Pat. No. 5,236,629 and U.S. Pat. No. 5,330,874.

The carrier particles can be mixed with the toner particles in various suitable combinations. The concentrations are usually about 1% to about 20% by weight of toner and about 80% to about 99% by weight of carrier. However, different toner and carrier percentages may be used to achieve a developer composition with desired characteristics.

The toners can be selected for electrostatographic or xerographic process, reference for example, U.S. Pat. No. 4,295,990, incorporated herein by reference in its entirety. In embodiments, any known type of image development system may be used in an image developing device, including, for example, magnetic brush development, jumping single-component development, hybrid scavengeless development (HSD), etc. These development systems are known in the art.

Imaging processes comprise, for example, preparing an image with a xerographic device comprising a charging component, an imaging component, a photoconductive component, a developing component, a transfer component, and a fusing component; and wherein the development component comprises a developer prepared by mixing a carrier with a toner composition illustrated herein. The xerographic device may comprise a high speed printer, a black and white high speed printer, a color printer, and the like.

Once the image is formed with toners/developers via a suitable image development method such as any one of the aforementioned methods, the image is then transferred to an image receiving medium such as paper and the like. In embodiments, the toners may be used in developing an image in an image-developing device utilizing a fuser roll member. Fuser roll members are contact fusing devices that are known in the art, in which heat and pressure from the roll are used in order to fuse the toner to the image-receiving medium. Typically, the fuser member may be heated to a temperature above the fusing temperature of the toner, for example to temperatures of from about 70° C. to about 160° C., for example from about 70° C. to about 150° C. or from about 80° C. to about 140° C., and then after or during the melting onto the image receiving substrate.

At the fusing-temperature, the epoxy resin of the toner may be crosslinked. Alternatively, crosslinking may be effected by heating the fused image to a temperature at which the epoxy resin will be crosslinked, for example in a post-fusing operation. Here, crosslinking may be effected at temperatures of from about 160° C. or less, for example from about 70° C. to about 160° C. or from about 80° C. to about 140° C.

The images that include the crosslinked epoxy resin exhibit excellent crease resistance, for example of about 1 mm or less, and excellent fracture coefficient, for example of about unity or less.

Example 1

A 2 liter Buchi reactor was charged with 500 grams of Dow Epoxy DER 664U, 125 grams of sulfonated polyester resin and 75 grams of nonionic solid surfactant (SYNPERONIC PE/F 108). The mixture was heated to 80° C. for 3 hours. Stirring was then applied at 200 rpm for 15 minutes. The temperature was then increased to about 90° C. and stirring increased to about 300 rpm for 1 hour, and then to 600 rpm for 20 minutes. The temperature slowly rose to 97° C. The reactor set point was then changed to 80° C., and water was added at a rate of about 10 grams every 5 to 10 minutes, until a total of 625 grams of water had been added and phase inversion had occurred. The mixture was then cooled and discharged to result in an average emulsion particle size of 270 nm.

The emulsion was then dried and mixed with 10% NACURE SUPER XC-7231. The resulting mixture cures at 140° C. to 160° C.

Example 2

To a 500 milliliter beaker was charged 42.7 grams of the Example 1 epoxy emulsion (solids content 46.82%), 4.98 grams of cyan pigment (solids content 17%) and 160 grams of water. After pH is adjusted to 2.5, the mixture was homogenized using an IKA T25 homogenizer at 6,500 rpm. To this mixture was added 13.5 grams of a coagulant solution consisting of 10 wt. % polyaluminum chloride (PAC) and 90 wt. % 0.02M HNO$_3$ solution. The pigmented slurry was then heated to 65° C. on a hotplate and stirred at 400 rpm until an average particle diameter of 8.33 µm was reached. A spherical toner with a GSD of 1.40 was obtained. The toner slurry was surface treated using 10% NACURE SUPER XC-1732 and then freeze-dried. The resulting toner was found to cure at 140° C.

Example 3

A 2 liter Buchi reactor was charged with 500 grams of Dow Epoxy DER 664U, 125 grams of sulfonated polyester resin and 25 grams of nonionic solid surfactant (SYNPERONIC PE/F 108). The mixture was heated to 80° C. for 3 hours. Stirring was then applied at 200 rpm for 15 minutes. The temperature was then increased to about 90° C. and stirring increased to about 300 rpm for 1 hour, and then to 600 rpm for 20 minutes. The temperature slowly rose to 97° C. The reactor set point was then changed to 80° C., and water was added at a rate of about 10 grams every 5 to 10 minutes, until a total of 625 grams of water had been added and phase inversion had occurred. The mixture was then cooled and discharged to result in an average emulsion particle size of 603.9 nm.

The emulsion was then dried and mixed with 10% NACURE SUPER XC-7231. The resulting mixture cures at 140° C. to 160° C.

Example 4

To a 500 milliliter beaker was charged 42.7 grams of the Example 3 epoxy emulsion (solids content 46.82%), 4.98 grams of cyan pigment (solids content 17%) and 160 grams of water. After the pH was adjusted to 2.5, the mixture was homogenized using an IKA T25 homogenizer at 6,500 rpm. To this mixture was added 8.15 grams of a coagulant solution consisting of 10 wt. % PAV and 90 wt. % 0.02M HNO$_3$ solution. The pigmented slurry was the heated to 65° C. on a hotplate and stirred at 400 rpm until an average particle diameter of 8.33 um was reached. A spherical toner with a GSD of 1.40 was obtained. The toner slurry was surface treated using 10% NACURE SUPER XC-1732 and then freeze-dried. The resulting toner cures at 140° C.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. An aqueous emulsion comprising:
an aqueous phase consisting essentially of water;
emulsified resin particles dispersed in the aqueous phase, the resin particles consisting essentially of a mixture of:
a bisphenol A based epoxy resin, and
a sulfonated polyester resin of the formula

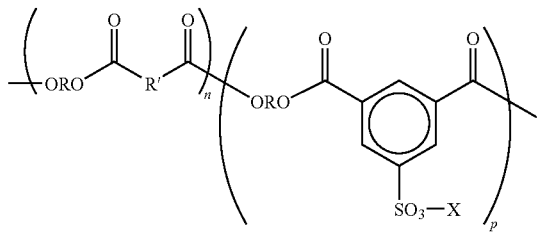

where:
R is an alkylene;
R' is an arylene;
p and n represent a number of repeating segments; and
X is an alkali metal; and
a nonionic surfactant comprising a block copolymer of polyethylene oxide and polypropylene oxide,
wherein:
the emulsified particles have an average diameter of from about 10 nm to about 500 nm, and
a solids content of the emulsion comprises from about 1% to about 40% by weight of the sulfonated polyester resin and from about 60% to about 99% by weight of the epoxy resin.

2. The emulsion according to claim 1, wherein the epoxy resin has a glass transition temperature of from about 40° C. to about 100° C.

3. The emulsion according to claim 1, wherein:
R is an alkylene of from about 2 to about 25 carbon atoms,
R' is an arylene of from about 6 to about 36 carbon atoms, and
p and n are each from about 10 to about 100,000.

4. The emulsion according to claim 1, wherein the nonionic surfactant is present in an amount of from about 0.5% to about 10% by weight of the emulsion.

5. The emulsion according to claim 1, wherein the emulsion further comprises an epoxy curing catalyst.

6. A toner comprising:
a binder comprising particles obtained from the emulsion of claim 1,
a colorant, and
optionally a wax.

7. The toner according to claim 6, wherein the epoxy resin has a glass transition temperature of from about 40° C. to about 100° C.

8. The toner according to claim 6, wherein:
R is an alkylene of from about 2 to about 25 carbon atoms,
R' is an arylene of from about 6 to about 36 carbon atoms, and
p and n are each from about 10 to about 100,000.

9. The toner according to claim 6, wherein the binder comprises from about 1% to about 40% by weight of the sulfonated polyester resin and from about 60% to about 99% by weight of the epoxy resin.

10. The toner according to claim 6, wherein the colorant comprises pigment, dye, mixtures of pigment and dye, mixtures of pigments or mixtures of dyes.

11. A developer comprising the toner of claim 6 admixed with a carrier.

12. A process of preparing the emulsion according to claim 1, comprising heating a mixture of the epoxy resin, the sulfonated polyester resin and the nonionic surfactant, and metering water into the mixture until phase inversion occurs to form the emulsion.

13. The process according to claim 12, wherein the heating is at a temperature of from about 50° C. to about 120° C., and wherein the metering is conducted while maintaining the temperature at from about 50° C. to about 120° C.

14. The process according to claim 12, wherein the process further comprises adding a colorant to the emulsion, heating to below a glass transition temperature of at least the epoxy resin, adding an aggregating agent, and aggregating the mixture to form toner particles.

15. The process according to claim 14, wherein the toner particles have a volume average diameter of from about 3 μm to about 12 μm.

16. An image forming device comprising a charging component, an imaging component, a photoconductive component, a developing component, a transfer component, and a fusing component, wherein the development component comprises a developer prepared by mixing a carrier with the toner according to claim 6.

* * * * *